INVENTORS:
RUDOLF RINESCH
FRIEDRICH KRUPP

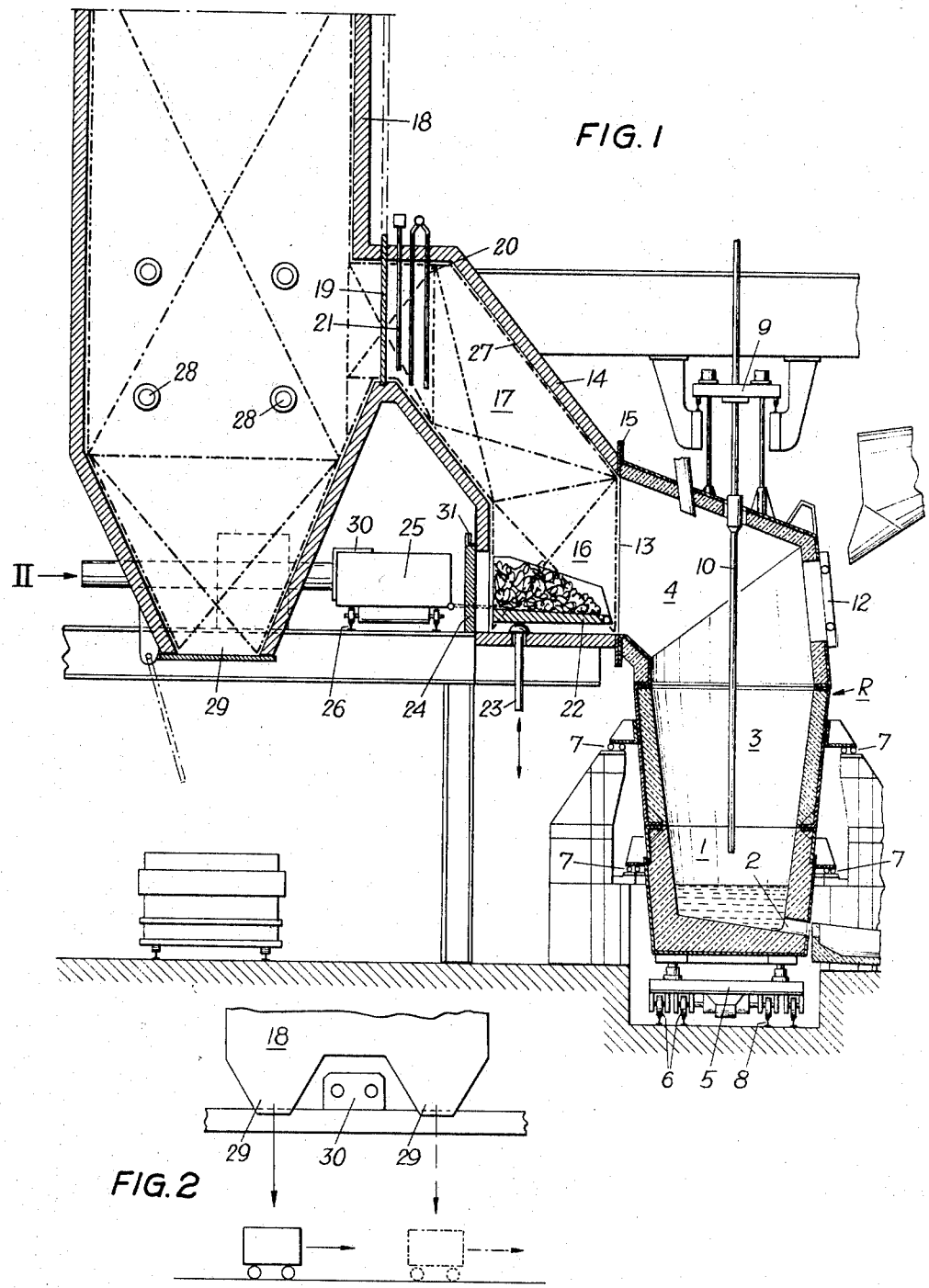

THEIR ATTORNEYS

United States Patent Office 3,472,500
Patented Oct. 14, 1969

3,472,500
PLANT COMPRISING A STATIONARY REACTION VESSEL FOR CONVERTING CHARGING MATERIALS INTO STEEL
Rudolf Rinesch and Friedrich Krupp, Linz, Austria, assignors to Vereininigte Osterreichische Eisen-und Stahlwerke Aktiengesellschaft, Linz, Austria, a company of Austria
Filed Feb. 17, 1967, Ser. No. 616,928
Claims priority, application Austria, May 24, 1966,
A 4,876/66
Int. Cl. C21b 1/00, 7/08; C21c 5/38; C22b 1/00
U.S. Cl. 266—13                                     9 Claims

ABSTRACT OF THE DISCLOSURE

A steel-making plant is described having a stationary waste gas chamber adapted to be coupled between the hood of a particular type of converting vessel and a waste heat boiler or flue gas cooler. The chamber includes provisions for pre-heating scrap and is lined with a network of pipes which are joined either to the boiler system if a waste heat boiler is employed, or to the cooling system of a flue gas cooler. Provisions are made for the removal of slag from the chamber and for sealing the chamber against the admission of unwanted air during the reaction process. The chamber construction is specifically adapted for use with a converter formed of a plurality of horizontally movable sections which are moved into registry with each other and the chamber during the steel-making process.

---

In co-pending patent application Ser. No. 579,574. The waste gas chamber, in conjunction with either the waste gas boiler or flue gas cooler, constitutes the system for discharging waste gases, i.e., the stack, for the reaction vessel. There is described and claimed a steelmaking plant including a stationary, refractory-lined reaction vessel for converting solid and liquid charging materials, such as pig iron and scrap, into steel, said vessel having a tapping hole near its bottom and comprising at least two horizontally displaceable parts adapted to be assembled to form the finished vessel, namely, one part taking up the liquid bath to be refined and having a sufficiently large reaction space for carrying out an oxygen top-blowing process, and a hood part adjoining the stack when in the blowing position and having means for the introduction of charging materials, of one or several blowing lances, and of admixtures.

The present invention relates to a further development of this idea and provides a plant with a reaction vessel of the kind described, which is characterised in that in the blowing position of the vessel a stationary, hoodlike waste gas chamber is provided, which is adapted to be joined to the hood part of the reaction vessel on one side and to a waste heat boiler or flue gas cooler on the other side, and which is gas-tightly sealable against the latter.

Preferably, the waste gas chamber comprises a part laterally adjoining the hood part of the refining vessel, said part being destined for pre-heating scrap, and a part adjoining thereto at an angle and providing the connection with the waste heat boiler or the flue gas cooler.

In the scrap pre-heating part of the waste gas chamber, a feed opening for scrap is provided, which is adapted to be closed and gas-tightly sealable. Preferably, a tiltable scrap tray which takes up the scrap is arranged in this lower part of the waste gas chamber.

Suitably, a flue gas register which may be water- or steam-cooled is provided for gas-tightly sealing the waste gas chamber against the waste heater boiler or the flue gas cooler; a slag collecting device is arranged to advantage in front of said register.

According to the invention, the stationary waste gas chamber is lined with pipes at least in the inclined part thereof, which adjoins the waste heat boiler or gas cooler, said pipes being joined to the boiler system of the waste heat boiler or to the cooling system of the flue gas cooler; preferably, however, such pipes are also provided in the lower part, which adjoins the vessel hood and is destined for pre-heating scrap.

The waste heat boiler or the flue gas cooler may be provided with slag funnels having the shape of breeches and leaving a passage to the scrap feed opening of the waste gas chamber.

In order that the invention may be more fully understood, embodiments in accordance therewith will now be described by way of example with reference to the accompanying drawings, in which:

FIG. 1 shows an elevation of an embodiment of the plant according to the invention, with a waste heat boiler;

FIG. 2 is a partial view in the direction of arrow II in FIG. 1; and

Figure 3:
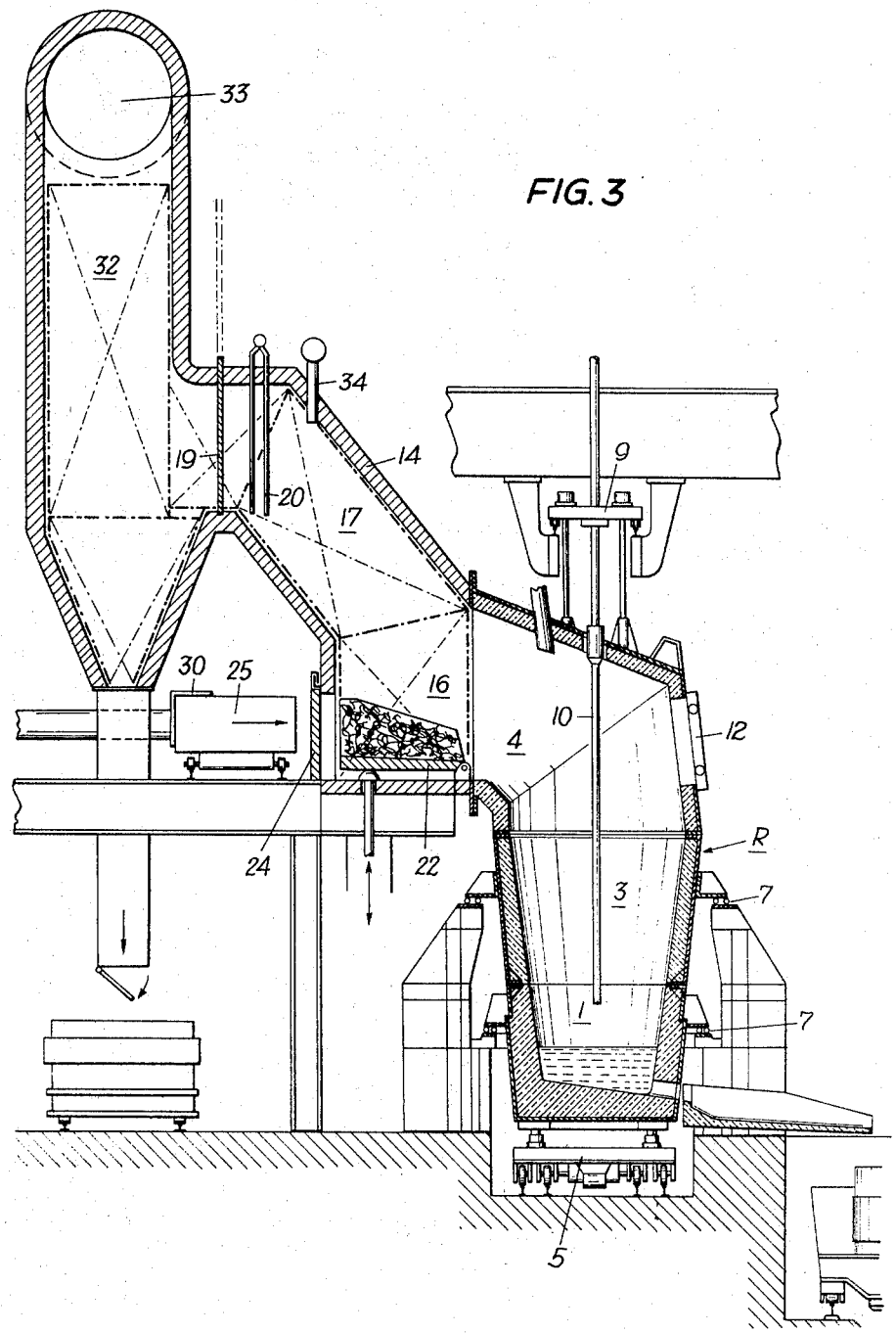
FIG. 3 shows a different embodiment of the plant according to the invention, with a flue gas cooler.

In FIG. 1, the reaction vessel is generally denoted by R. It comprises the bottom part 1, which takes up the liquid bath and has a tap hole 2 capable of being closed, the middle part 3 and the hood part 4. To facilitate relining or repair the three parts 1, 3, and 4 are horizontally displaceable, e.g., toward the relining stands, namely, the bath-holding part 1 is displaceable by means of the bogie 5 running on wheels 6 along rails 8 provided in a pit, and by means of oppositely arranged roller tracks 7. The vessel part 3 is also horizontally displaceable by means of oppositely arranged roller tracks 7. The hood part 4, which is penetrated by a blowing lance 10 and provided with a feed opening 12 for charging pig iron, which is adapted to be closed, is displaceable by means of a hood carriage 9, as described in co-pending patent application Ser. No. 579,574. In the blowing position, the three parts are joined to form a structurally integral refining vessel, which during the steel-making operation, is non-tiltable and stationary.

Hood 4, which is suitably provided with a refractory lining, is open on the side opposite to the pig iron charging opening, at 13. This open part can be joined to the stationary waste gas chamber 14, when in blowing position, suitably by means of an annular flange connection, as indicated at 15. As evident, the waste gas chamber consists of two parts meeting at an angle, namely, the lower part 16 destined for pre-heating scrap, and the hood-shaped part 17 connected at its end to the stationary waste heat boiler 18 (FIG. 1). Part 17 is gas-tightly sealable against the waste heat boiler 18 by means of a water-cooled flue gas register 19. In front of the flue gas register, one or several slag collecting screens 20 as well as air feeding pipes 21 penetrate the upper roof of part 17 of the waste gas chamber. Instead of air feeding pipes, closeable slits may also be provided. A tiltable tray 22 is arranged on the bottom of the scrap pre-heating part 16 and operable by means of the hydraulic jack 23. The scrap pre-heating chamber 16 has a gas-tightly sealable opening 24 on the side opposite to opening 13 of the hood 4 of the refining vessel, and is fed from that side with scrap by means of a charging machine from a charging carriage 25 running upon rails 26.

It is an important characteristic of the invention that the waste gas chamber 14 has, at least in its upper part 17, preferably, however, in both its parts 16 and 17, no refractory lining, but is lined with pipes, as indicated by the broken lines 27. Suitably, these pipes are joined to pipes of the boiler system of the waste heat boiler. However, it is also possible to join the pipes 27 to a cooling system which is separate from the waste heat boiler, and, for instance, to produce low pressure steam by this system, while the waste heat boiler produces high pressure steam. Numeral 28 indicates gas or oil burners in the waste heat boiler 18.

As evident from FIG. 2, the waste heat boiler contains two slag funnels 29 arranged in the shape of breeches to leave a passage to the charging opening 24, e.g. for the charging device 30, between them. By means of this charging device 30, the door being open, the scrap coming from the charging carriage 25 is pushed from the tiltable scrap tray 22 in the scrap pre-heating chamber 16 into the reaction vessel R. Numeral 31 denotes a sand tray sealing for the door of opening 24. Actually, also the other openings of the plant, e.g. opening 12 destined for feeding pig iron, and the passage for the blowing lance 10, have to be sealed off so that no secondary air can be sucked in anywhere. Behind the waste heat boiler, a down-draft ventilator is arranged which controls suction of the waste gases. The introduction of pig iron and admixtures is carried out in the same manner as described in co-pending patent application Ser. No. 579,574.

As soon as the refining process has started and CO-containing gases escape, air for combustion is controlledly fed through air feeding pipes or slits 21 and the flue gas is inflamed. The slag collecting screen 20, which consists of one or several rows of pipes, prevents slag from entering into the waste heat boiler. Slag falling off the screen slides down the inclined plane of the waste gas chamber 14, falls upon the scrap and is again fed into the vessel during the next charging operation. Lesser amounts of slag getting into the waste heat boiler 18 are removed through the slag funnels 29.

In the modified embodiment according to FIG. 3, substantially the same parts as already described in connection with FIG. 1 are provided. Here, also, the waste gas chamber 14 is lined with pipes in its upper part 17 as well as in its lower part 16, through which pipes a cooling medium is circulated. The embodiment according to FIG. 3 differs from the one in FIG. 1 mainly in that the waste gas chamber is not joined to the waste heat boiler, but to a flue gas cooler 32, which is connected with a flue gas exhausting pipe 33. Further, air feeding pipes and slits 21 are omitted. Instead, an inert-gas pipe 34 penetrates the roof of part 17 of the waste gas chamber.

The refining process, charging of scrap, etc., are carried out in the same way as in the embodiment according to FIG. 1. As soon as the refining process has started and CO escapes, the latter is collected after cooling and leading off by means of pipe 33. With this embodiment, it is important that all parts are effectively sealed against each other to prevent entrance of air, which might involve the risk of an explosion. The flue gas register 19 must be kept closed during charging. In addition, inert gas has to be blown in through the inert-gas pipe 34, if any opening in the space between the flue gas register and the refining vessel is open so that no explosive mixture can be formed.

What we claim is:

1. A plant including a refractory-lined reaction vessel for converting solid and liquid charging materials into steel, said vessel having a tapping hole near its bottom and comprising at least two parts horizontally displaceable into and out of a blowing position and adapted to be assembled to form the finished vessel, said vessel being stationary and nontiltable in the blowing position, one of said parts taking up the liquid bath to be refined and having a sufficiently large reaction space for carrying out an oxygen top-blowing process, and another of said parts constituting a hood part having means for the introduction of blowing lances and for feeding charging materials and admixtures, and a waste gas discharging system for said vessel including a stationary, hood-like waste gas chamber being provided in said blowing position and a waste gas processing unit, said chamber being adapted to be joined to said hood part of said reaction vessel on one side, and to said waste gas processing unit on the other side, and gas-tightly sealable against the latter.

2. A plant as set forth in claim 1 wherein said waste gas processing unit is a waste heat boiler.

3. A plant as set forth in claim 1 wherein said waste gas processing unit is a flue gas cooler.

4. A plant including a refractory-lined reaction vessel for converting solid and liquid charging materials into steel, said vessel having a tapping hole near its bottom and comprising at least two parts horizontally displaceable into and out of a blowing position and adapted to be assembled to form the finished vessel, said vessel being stationary and non-tiltable in the blowing position, one of said parts taking up the liquid bath to be refined and having a sufficiently large reaction space for carrying out an oxygen top-blowing process, and another of said parts constituting a hood part having means for the introduction of blowing lances and for feeding charging materials and admixtures, and a waste gas discharging system for said vessel including a stationary, hood-like waste gas chamber being provided in said blowing position and a waste gas processing unit, said waste gas chamber comprising a part laterally adjoining said hood part of said refining vessel and being destined for pre-heating scrap, and a part adjoining thereto at an angle and providing the connection with and being gas-tightly sealable against said waste gas processing unit.

5. A plant as set forth in claim 4 wherein a tiltable scrap tray is arranged in the lower part of said waste gas chamber, which is destined for pre-heating scrap, and a closeable opening for conveying scrap to said scrap tray is provided in said lower part of said waste gas chamber.

6. A plant as set forth in claim 4 wherein a fluid-cooled flue gas register is provided for gas-tightly sealing said waste gas chamber against said waste gas processing unit.

7. A plant including a refractory-lined reaction vessel for converting solid and liquid charging materials into steel, said vessel having a tapping hole near its bottom and comprising at least two parts horizontally displaceable into and out of a blowing position and adapted to be assembled to form the finished vessel, said vessel being stationary and non-tiltable in the blowing position, one of said parts taking up the liquid bath to be refined and having a sufficiently large reaction space for carrying out an oxygen top-blowing process, and another of said parts constituting a hood part having means for the introduction of blowing lances and for feeding charging materials and admixtures, a waste gas discharging system for said vessel including a stationary, hood-like waste gas chamber being provided in said blowing position and a waste gas processing unit, said waste gas chamber comprising a part laterally adjoining said hood part of said refining vessel and adapted for pre-heating scrap, and a part adjoining thereto at an angle, a fluid-cooled flue gas register for gas-tightly sealing said waste gas chamber against said waste gas processing unit, and a slag collecting screen arranged in front of said flue gas register.

8. A plant as set forth in claim 4 wherein said stationary waste gas chamber is lined with pipes at least in the inclined part thereof, which pipes are suitably joined to said waste gas processing unit.

9. A plant as set forth in claim 4 wherein a tiltable scrap tray is arranged in the lower part of said waste gas chamber, which is destined for pre-heating scrap and has a closeable opening for conveying scrap to said scrap tray, said waste gas processing unit being provided with slag funnels having the shape of breeches and leaving a passage to said scrap charging opening of said waste gas chamber.

References Cited

UNITED STATES PATENTS

| | | | |
|---|---|---|---|
| 10,481 | 5/1884 | Clapp et al. | 266—35 |
| 2,670,945 | 3/1954 | Hazen. | |
| 2,818,247 | 12/1957 | Francis | 266—35 |
| 3,149,959 | 9/1964 | Nicholson | 266—39 X |
| 3,215,425 | 11/1965 | Vogt | 266—35 |
| 3,224,750 | 12/1965 | Baum | 266—35 |
| 3,307,935 | 3/1967 | Lindholm | 266—35 X |
| 3,347,539 | 10/1967 | Mitchell et al. | 266—31 X |

J. SPENCER OVERHOLSER, Primary Examiner

JOHN S. BROWN, Assistant Examiner

U.S. Cl. X.R.

266—15, 31

PO-1050
(5/69)

UNITED STATES PATENT OFFICE
CERTIFICATE OF CORRECTION

Patent No. 3,472,500     Dated Oct. 14, 1969

Inventor(s) Rudolf Rinesch and Friedrich Krupp

It is certified that error appears in the above-identified patent and that said Letters Patent are hereby corrected as shown below:

Col. 1, line 34, after "579,574" cancel the period and insert --filed September 15, 1966 and assigned to the present assignee--;

Col. 1, lines 35-38, cancel beginning with "The waste gas" to and including "tion vessel.";

Col. 1, line 38, change "There" to --there--;

Col. 1, line 58, after "latter." insert --The waste gas chamber, in conjunction with either the waste gas boiler or flue gas cooler, constitutes the system for discharging waste gases, i.e., the stack, for the reaction vessel.--;

Col. 2, line 5, "waste heater boiler" should read --waste heat boiler--.

SIGNED AND
SEALED
MAY 12 1970

(SEAL)
Attest:

Edward M. Fletcher, Jr.
Attesting Officer

WILLIAM E. SCHUYLER, JR
Commissioner of Patents